Oct. 14, 1958     R. V. HUTCHINSON     2,856,213
MOUNTING DEVICE
Filed April 23, 1953
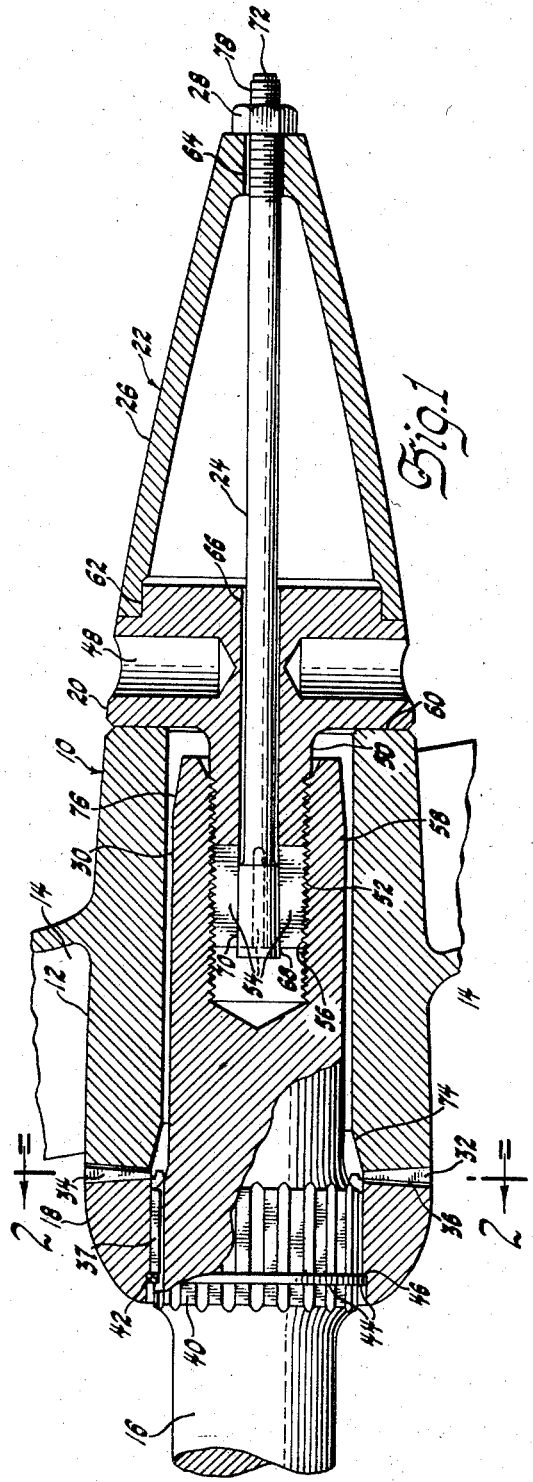
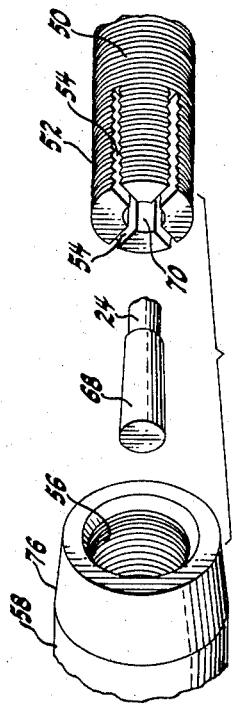
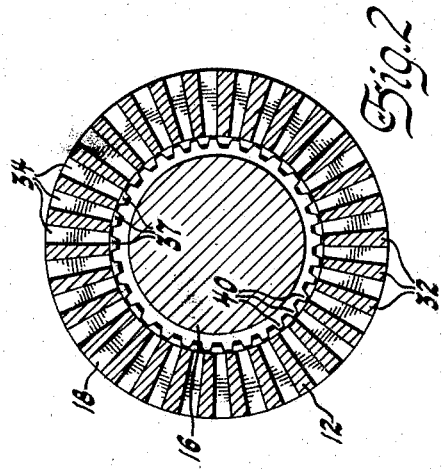
INVENTOR
Roland V. Hutchinson
BY
Lewis D. Burch
ATTORNEY

United States Patent Office 2,856,213
Patented Oct. 14, 1958

2,856,213

MOUNTING DEVICE

Roland V. Hutchinson, Birmingham, Mich., assignor to General Motors Corporation, Detroit, Mich., a corporation of Delaware Application April 23, 1953, Serial No. 350,592

6 Claims. (Cl. 287—53)

The present invention relates to a mounting device and more particularly to a device suitable for mounting a marine propeller on a drive shaft.

In present practice, one method of mounting a marine propeller on a drive shaft is to provide a propeller hub having a tapered axial bore to be assembled on a shaft having a tapered end. The hub and shaft are rotatably engaged by a key, and the assembly is axially locked by tightening a nut on the shaft end against the hub to engage the tapered surfaces. Another method of making such a mounting is to provide a hub having an internally splined axial bore and to assemble the hub on a shaft having an externally splined free end so that the hub and the shaft are rotatably engaged. The assembly is then axially locked by tightening a nut on the end of the shaft so that conically formed faces on each end of the hub engage complementary conically formed faces on or associated with the shaft.

Mounting devices such as those described above are unsatisfactory because the hub frequently sticks or freezes to the shaft at the tapered surfaces. When the cone of the hub is tightened on the cone of the shaft radial forces are set up which tend to compress the shaft cone and to expand the hub cone, the latter to a greater degree. Consequently, a hub-pulling tool is normally required to remove the hub from the shaft. This may be a difficult task in the case of a large propeller.

Unless the hub and the shaft dimensions approach theoretical exactness, the above radial forces will not be constant. The hub wall is normally thicker at the small end of the shaft than it is at the large end. Therefore it will resist expansion more at that point, setting up a greater stress. Furthermore, a cast propeller hub has surface and internal imperfections which produce variations in hub wall thickness and strength. Also, ordinary machining methods often produce measurable variations in taper sufficient to create areas of greater radial stress, so much so that lapping of the tapered surfaces has been resorted to in the past in order to minimize such conditions. A high-speed propeller assembly is subjected to severe torsional and vibrational stresses and where sufficient radial forces exist between the hub and shaft cones, the relative motion or rubbing of these parts caused by the torsional and vibrational stresses will produce galling or cold welding. This may occur to such a degree that it is impossible to pull the hub off the shaft without damaging or destroying some of the parts in the assembly during the course of repairs. The latter obviously becomes difficult and time-consuming work particularly when performed by a diver in the case of underwater repairs and when, for example, a propeller several feet in diameter is being removed.

The fact that it is relatively difficult to machine the tapers of both the hub and the shaft so as to provide the kind of assembled fit necessary to minimize galling makes galling a frequent occurrence. This being so, it is often necessary to correct the tapered surface of the galled shaft prior to replacing a propeller, which may require removal of the shaft.

In underwater repairs, especially if the propeller is relatively large, it is difficult to match splines or fit keys in assembling the hub on the shaft. This is because the propeller is usually lowered over the stern by a sling around the base of one of the blades. Under these circumstances the hub cannot be easily rotated on its axis and with respect to the axis of the shaft. It is obviously easier to first loosely support such a hub having a smooth bore on a smooth shaft and then to rotate the hub slightly so that radial teeth on the hub and on the shaft will mesh.

Moreover, similar or identical materials have a greater tendency to gall, other factors being equal. Thus, in present practice, it is sometimes necessary to reject a material that is desirable from strength and corrosion resistance considerations merely to further reduce the possibility of galling. This is an unnecessary limitation on the variability of design.

It is proposed to provide a hub mounting wherein sticking of the hub to the shaft is entirely eliminated notwithstanding severe stresses and strains and notwithstanding the use of similar or identical materials for all parts of the assembly. This is conveniently accomplished by eliminating the use of tapered surfaces in conjunction with keys or splines and providing in their place radially disposed centering and driving means and positive securing and locking means so that there is clearance between the hub bore and the shaft and radial forces cannot be set up between those surfaces. It then follows that there can be no rubbing of those surfaces due to the clearance between them.

It is also proposed to provide a mounting device which can be easily and quickly assembled or dis-assembled with the use of a few simple tools by forming the above locking means in such a way that it can be instantly unlocked merely by backing-off a nut on a bolt at the rear of the device and giving the bolt end a sharp blow with the same tool, or it can be instantly locked by tightening the same nut. Due to the elimination of the galling, the necessity of using a hub-pulling tool even when galling does not occur, and the necessity of matching splines or fitting keys, and due to the speed with which the mounting device can be locked and unlocked it has been possible to replace both of the propellers of a twin-screw vessel in less time than it formerly took to remove one conventionally-mounted propeller. This is particularly desirable, especially where emergency repairs of rescue craft and the like are necessary.

In the drawings:

Fig. 1 is in part a cross sectional view, with portions thereof broken away, of a marine propeller mounting device embodying the present invention.

Fig. 2 is in part a cross sectional view taken substantially along the plane of line 2—2 of Fig. 1.

Fig. 3 is an exploded view of certain internal details of construction.

Referring to the drawings in which the propeller mounting device is generally referred to as 10, a hub 12 having blades 14 is supported on drive shaft 16. A driving means 18 extends between hub 12 and shaft 16. Securing and locking means 22 cooperates with shaft 16 to tightly engage hub 12 with driving means 18 and shaft 16.

Hub 12 has a cylindrical axial bore therethrough so that said hub can be loosely fitted at 30 on the cylindrical end 58 of shaft 16. The taper 74 on hub 12 and the taper 76 on shaft end 58 facilitate assembly of hub 12 on shaft end 58. Furthermore, hub 12 has formed on one end thereof radially disposed teeth 32 which may be formed in any suitable manner, but which, in the preferred embodiment shown, are uniform in width and radially shaped and which present a trapezoidal transverse cross section so that the teeth can be wedged into mesh with similar radially disposed teeth 34 formed on driving means 18. The wedged engagement of teeth 32 and 34 also provides means centering the hub 12 relative to the shaft end 58 and insures a clearance therebetween which reduces the likelihood of galling. Clearance 36 at the teeth ends is thus always maintained, insuring firm contact between the flanks of the meshing teeth.

Driving means 18 is suitable fixed to shaft 16 so that torque is transmitted from shaft 16 through driving means 18 and to hub 12. One way of doing this is to engage driving means 18 and shaft 16 by interlocking splines 37 on driving means 18 and splines 40 on shaft 16. To approach conditions of integral construction, driving means 18 is preferably shrunk on shaft 16. Axial movement of driving means 18 can be effectively prevented by some means such as a ring 42 which is retained by groove 44 formed in shaft 16 and which engages a shoulder 46 formed on driving means 18.

Securing and locking means 22 may be composed of any number of members, though in the present instance the means consists of four members. Tail bolt member 20 has external threads 52 provided on the end of a cylindrical projection 50, the threads being axially split at 54 and having a tapered seat 70. Also, the tail bolt member is formed so that it can be screwed into internal threads 56 of shaft end 58 by using a spanner wrench inserted into holes 48. In this manner a face on tail bolt member 20 is made to exert force at 60 on a mating face on hub 12 to wedge into mesh teeth 32 and 34. Fairing member 26, which can be hollow and tapered to reduce weight and to streamline the particular mounting device shown, is made to engage a shoulder 62 on tail bolt member 20 and has an axial bore at 64 which is aligned with an axial bore 66 in tail bolt member 20. Draw bolt member 24 loosely passes through bore 66 and bore 64 and is provided with a tapered end 68 which is drawn into tapered seat 70 to radially expand and lock said axially split threads 52 against threads 56 when a nut 28 is tightened on draw bolt threads 78.

Dis-assembly only requires that nut 28 be backed off slightly so that a sharp blow at draw bolt end 72 will force tapered end 68 out of seat 70. Securing and locking means 22 is then removed as a unit by unscrewing tail bolt member 20, and hub 12 is easily pulled off the shaft end 58. Assembly, of course, requires an opposite procedure, as has already been explained. The radially disposed interlocking teeth 32 and 34 render the hub 12 self-centering, provided the hub and the driving means 18 are concentric with the axis of the shaft. Since the device 10 is positively centered, secured and locked, sticking cannot occur and replacement of the hub is easily and rapidly accomplished.

What is claimed is:

1. A mounting device comprising a rotatable member having an integral hub provided with a shaft receiving bore and mounted on a drive shaft extending therein, the portion of said shaft extending in said hub bore being of lesser diameter than said hub bore, said shaft being internally threaded at one end and having hub driving means associated therewith in positive driving relationship, said driving means being formed to provide radially disposed interlocking means between one end of said hub and said shaft, and means cooperating with said internally threaded end of said shaft and the other end of said hub to secure said hub to said shaft, said driving and securing means providing the only contact between said hub and said shaft when said hub is secured in driving position.

2. A mounting device comprising a rotatable member having an integral hub, said hub having a constant diameter axial bore therein and radial serrations on one end face thereof, a shaft having a driving member non-rotatably secured thereon and being internally threaded at one end and having a portion of lesser diameter than said hub bore extending with deliberate clearance into said bore so that said shaft cannot engage said hub at said bore when said hub is secured in position, said driving member being formed to provide radial serrations adapted to engage said radial serrations on said hub, means cooperating with said internally threaded end of said shaft causing engagement of said radial serrations and for securing said hub to said shaft, and locking means for securing said mounting device in assembled relationship, said hub and said shaft having complementary guide surfaces for guiding said rotatable member into position during assembly.

3. A mounting device comprising a rotatable member having an integral hub, said hub having oppositely disposed end faces and an axial bore of constant diameter therein and lengthwise radially disposed teeth on one end face thereof, a shaft of lesser diameter than any part of said bore extending into said bore, said shaft having a removable driving member associated therewith and being internally threaded at one end, said driving member being formed to provide lengthwise radially, disposed teeth extending normally to the axis of said shaft and adapted to engage said radially disposed teeth on said hub, means cooperating with said internally threaded end of said shaft for engaging said radially disposed teeth and for securing said hub to said shaft, said means being formed to provide external threads engaging said internally threaded end of said shaft and a face engaging one of said oppositely disposed end faces on said hub, said oppositely disposed end faces on said hub being the only areas of contact between said hub and the other elements of said mounting device, and longitudinally split locking means to fix said threads substantially all around the periphery thereof and maintain the engagement of said engaging faces, said mounting device being assembled and locked by successive actuation of said two last mentioned means.

4. A mounting device comprising an integral propeller and hub having a constant diameter axial bore therethrough and lengthwise radially disposed serrations on one end thereof normal to said bore, a drive shaft having a removable driving member splined and shrunk thereon and being internally threaded at its free end and extending through said bore with sufficient clearance to be entirely free of engagement with the walls thereof, said driving member being formed to provide radial serrations extending lengthwise normal to said shaft and engaging said radial serrations on said hub, means cooperating with said internally threaded free end of said shaft for causing engagement of said radial serrations, said means being formed to provide an externally threaded and axially split projection having a tapered seat coaxially within said projection and a face normal to the axis of said shaft engaging a complementary face on said hub, and locking means firmly securing said hub to said shaft, said locking means being formed as a draw bolt having a tapered end adapted to be drawn into said tapered seat whereby the entire periphery of said externally threaded and axially split projection is radially expanded against said internally threaded free end of said shaft.

5. Means for mounting a rotatable member upon a drive shaft and which includes, a hub member provided upon said rotatable member and having an axial bore formed therethrough, drive and centering means engaging one face side of said hub to said drive shaft, said drive shaft having a portion of lesser diameter than said hub bore extending through said bore in radially spaced relation thereto, and axially adjustable means secured to the end of said drive shaft and engaging the other face side of said hub for making secure the engagement of said hub to said drive shaft through said drive and centering means.

6. Mechanism for attaching a rotatable member to a drive shaft whereby said member is rotatably drivable by said shaft, said rotatable member including a hub section having a cylindrical bore extending axially therethrough and radially extending first and second faces defining end surfaces, said first face having radially extending centering driven splines formed thereon, said shaft including a splined driving section and an internally threaded securing section adjacent said driving section, said securing section being formed on the terminal end of said shaft and extending loosely within said hub bore and having radial clearance between said hub bore and said shaft at all points, means for removably attaching said rotatable member to said shaft comprising an annular element drivably intermediate said shaft and said hub, said annular element being splined to said shaft driving section, means for preventing axial movement of said annular element on said shaft beyond a predetermined point, said annular element having a radially extending face including radially extending centering drive splines in centering engagement with said hub centering splines, said attaching means comprising a bolt member having an axially split threaded portion threadedly engaging said internally threaded securing section and a head portion engaging said hub second face and further having an axially extending passage, wedge securing and locking means slidably received in said bolt member axial passage and movable in and engageable therewith to expand said axially split threaded portion to lock said bolt member internally to said shaft securing section.

References Cited in the file of this patent

UNITED STATES PATENTS

| | | |
|---|---|---|
| 798,440 | McNulty | Aug. 29, 1905 |
| 889,894 | Berentsen | June 9, 1908 |
| 1,057,561 | Fayard | Apr. 1, 1913 |
| 1,223,330 | Royce | Apr. 17, 1917 |
| 1,288,136 | Neuteboom | Dec. 17, 1918 |
| 1,472,798 | Gyllsdorff | Nov. 5, 1923 |
| 1,498,718 | Crowder | June 24, 1924 |
| 1,511,910 | Royce | Oct. 14, 1924 |
| 1,931,861 | Croom | Oct. 24, 1933 |
| 2,071,363 | Shannon | Feb. 23, 1937 |
| 2,397,545 | Hardinge | Apr. 2, 1946 |

FOREIGN PATENTS

| | | |
|---|---|---|
| 760 | Australia | May 21, 1926 |
| 251,908 | Great Britain | May 13, 1926 |
| 305,473 | Great Britain | Mar. 27, 1930 |
| 616,293 | France | Jan. 31, 1927 |
| 694,986 | Germany | Aug. 13, 1940 |